US012810368B2

(12) United States Patent
Malewicz

(10) Patent No.: US 12,810,368 B2
(45) Date of Patent: Nov. 24, 2026

(54) METHOD FOR PRESENTING SITES USING THEIR SIMILARITY AND TRAVEL DURATION

(71) Applicant: Grzegorz Malewicz, Portland, OR (US)

(72) Inventor: Grzegorz Malewicz, Portland, OR (US)

( * ) Notice: Subject to any disclaimer, the term of this patent is extended or adjusted under 35 U.S.C. 154(b) by 320 days.

(21) Appl. No.: 18/268,615

(22) PCT Filed: Dec. 24, 2021

(86) PCT No.: PCT/US2021/065165
§ 371 (c)(1),
(2) Date: Jun. 21, 2023

(87) PCT Pub. No.: WO2022/140704
PCT Pub. Date: Jun. 30, 2022

(65) Prior Publication Data

US 2024/0046389 A1 Feb. 8, 2024

Related U.S. Application Data

(60) Provisional application No. 63/237,535, filed on Aug. 27, 2021, provisional application No. 63/168,279, filed on Mar. 31, 2021, provisional application No. 63/130,693, filed on Dec. 27, 2020.

(51) Int. Cl.

| | |
|---|---|
| ***G06Q 50/16*** | (2024.01) |
| ***G06Q 10/047*** | (2023.01) |
| ***G06Q 50/163*** | (2024.01) |
| ***G06Q 50/40*** | (2024.01) |

(52) U.S. Cl.
CPC ........... *G06Q 50/163* (2013.01); *G06Q 50/40* (2024.01)

(58) Field of Classification Search
CPC ...... G06Q 50/16; G06Q 50/163; G06Q 50/40; G06Q 10/047; G06Q 30/0241; G06Q 30/0282; G06Q 50/10; G06F 16/29; G01C 21/3446
See application file for complete search history.

(56) References Cited

U.S. PATENT DOCUMENTS

| | | | | |
|---|---|---|---|---|
| 8,095,434 B1 * | 1/2012 | Puttick | G06Q 30/0639 705/26.9 |
| 11,532,057 B1 * | 12/2022 | Rawat | G06F 16/5866 |
| 2002/0035535 A1 * | 3/2002 | Brock, Sr. | G06Q 30/0601 705/26.1 |

(Continued)

FOREIGN PATENT DOCUMENTS

| | | | |
|---|---|---|---|
| WO | WO-2014071505 A1 * | 5/2014 | G06F 16/24573 |
| WO | WO-2016003984 A1 * | 1/2016 | G01C 21/343 |

OTHER PUBLICATIONS

JP 2011090530 A with English translation, date filed Oct. 22, 2009; date published May 6, 2011, all pages. (Year: 2011).*

*Primary Examiner* — Calvin Cheung
(74) *Attorney, Agent, or Firm* — Grzegorz Malewicz

(57) ABSTRACT

Embodiments determine indications of sites using their similarity and travel duration. One embodiment is a method that operates on real estate properties. The method receives destinations of commutes. In order to improve usability, the method determines a real estate property within a cluster of real estate properties that have similar features and that have proximate commute durations. Indications of at least one real estate property are presented to the user.

1 Claim, 6 Drawing Sheets

(56) References Cited

U.S. PATENT DOCUMENTS

| | | | | |
|---|---|---|---|---|
| 2003/0074132 | A1* | 4/2003 | Sutanto | G01C 21/3881 701/409 |
| 2004/0260465 | A1* | 12/2004 | Tu | G01C 21/34 701/426 |
| 2010/0063829 | A1* | 3/2010 | Dupray | G06Q 30/0603 705/313 |
| 2011/0289009 | A1* | 11/2011 | Rankin, Jr. | G06Q 10/10 707/769 |
| 2014/0107921 | A1* | 4/2014 | Delling | G01C 21/3446 701/533 |
| 2014/0141812 | A1* | 5/2014 | Cho | H04W 4/029 455/456.3 |
| 2018/0130100 | A1* | 5/2018 | Kim | G06Q 30/0278 |
| 2023/0298078 | A1* | 9/2023 | Dupray | G06Q 40/02 705/313 |

* cited by examiner

METHOD FOR PRESENTING SITES USING THEIR SIMILARITY AND TRAVEL DURATION

CROSS-REFERENCE TO RELATED APPLICATIONS

This application is based upon, and claims the priority dates of, applications:

| [Country] | [Application Number] | [Filing Date] |
|---|---|---|
| USA | 63130693 | Dec. 27, 2020, |
| USA | 63168279 | Mar. 31, 2021, |
| USA | 63237535 | Aug. 27, 2021, |

which are incorporated herein by reference as if fully set forth.

BACKGROUND OF THE INVENTION

Embodiments relate to presenting results of searching or comparing sites using: similarities among sites, and travel durations within a transportation system.

When presenting results of a search request to a user, search engines traditionally organize the results, so as to decrease the information overload placed onto the user, and increase relevance. The organizing is typically done using two techniques: clustering and scoring. A goal of clustering is to group similar search results, so as to avoid presenting repetitive information to the user. A goal of scoring is to order search results, so as to limit the presentation to the information that is most useful to the user.

The notion of similarity has an intuitive meaning of a sufficient resemblance between items. We use the term similarity in a broad sense, consistent with an interpretation of the term by a person of ordinary skill in the art. Formally, similarity can be modeled as a mathematical function that assigns a number in the range from 0 to 1 to a pair of items. A number 0 means that the two items are not similar, while a number 1 means that they are similar. Numbers in between represent various degrees of near dissimilarity or near similarity. In one embodiment, two items are defined as similar when the number is at least a threshold, for example at least 0.9. In this invention disclosure, any item is considered similar to itself. Similarity is defined in various ways in concrete contexts. In one embodiment, using text: for example, two web pages are defined as similar, when they match on at least 90% of parts of text, for example n-grams, for n=5. In one embodiment, using numeric values: for example, two real estate property listings are defined as similar, when their price differs within 5% and they have the same geographical location. In one embodiment, similarity is defined using an artificial intelligence software executed on items by a computer system. Examples of the artificial intelligence software include: a neural network, a support vector machine, a Markov model, a Bayesian network, and so on. For example, similarity between two real estate property listings is defined using the artificial intelligence software, executed on images associated with the real estate property listings, that produces a similarity number in the range from 0 to 1. In one embodiment, similarity is defined on normalized items, for example: a text “San Francisco, Cali.” included in an item is transformed into a text “San Francisco, CA”, an area in square feet is converted into an area in square meters, or colors of pixels of an image are rescaled to achieve an average brightness of 50%. In one embodiment, similarity is defined using items represented as mathematical vectors, and using a distance between vectors, for example Chebyshev distance, Minkowski distance, and so on. In one embodiment, similarity is defined as: cosine similarity, a string similarity (e.g., Levenshtein distance), a semantic similarity, and so on. In one embodiment, coordinates of vectors are normalized, for example so as to achieve the mean of zero, and the variance of one. In one embodiment, similarity is defined by combining at least two similarities, for example: using a match for the text included in items, but using an artificial intelligence software for the images included in items, and combining the two results, for example using a weighted sum. In one embodiment, similarity uses only a part of items, for example ignoring the mortgage information of real estate property listings. Many other ways of defining similarity will be apparent to one of ordinary skill in the art, without departing from the scope and spirit of the embodiments.

The problem of clustering has been studied extensively. See, for example, a prior art survey by Jain, Murty and Flynn: “Data Clustering: A Review”, ACM Computing Surveys, Vol. 31, No. 3, September 1999. Simplifying somewhat, given some number of items, and a notion of similarity between the items, the goal is to assign the items into groups of similar items. Many clustering methods have been developed by prior art, for example: connectivity-based clustering, for example a hierarchical agglomerative clustering; centroid-based clustering, for example a k-means clustering; distribution-based clustering, for example an expectation—maximization algorithm; density-based clustering, for example DBSCAN; grid-based clustering, for example STING or CLIQUE; pre-clustering, for example canopy clustering; subspace clustering, for example CLIQUE or SUBCLU; projected clustering, for example PreDeCon; and so on. In one embodiment, a clustering method computes clusters that satisfy additional requirements. Example requirements include: a minimum or a maximum cluster size, a minimum or a maximum cumulative similarity within a cluster, and so on. The additional requirements are determined based on the context in which the clusters are used.

A trivial approach to clustering involves computing similarity between items in every pair, and assigning items to the same group when their similarity is at least a threshold. However, a quadratic number of pairs of items renders this trivial approach impractical when the number of items is large. In order to overcome the scalability problem due to a quadratic number of pairs, search engines often use a heuristic to prune pairs that are unlikely to be similar. For example, one such heuristic is described by prior art U.S. Pat. No. 6,658,423 B1. In this context, each item is a web page. The heuristic assigns a hash value to each web page. A hash value can be thought of as a very short text, derived from a possibly very long text of a web page. The web pages are then grouped based on the hash values (which can be simply done by sorting hash values, bucketing, or the like), and similarity is computed only between the web pages that have the same hash value. Hash values are crafted in such a way, that a match of hash values of two web pages is often equivalent to the two web pages being similar. This can be achieved, for example, using n-grams. As a result, the heuristic can dramatically decrease the number of similarities that need to be computed, compared to the trivial quadratic approach.

Several other heuristics have been developed, so as to achieve practical clustering in specific application domains.

For example, wherein the items are real estate properties, heuristics include prior art: US 20150012335 A1, U.S. Pat. Nos. 9,858,628 B2, and 10,776,888 B1. While, wherein the items are job postings, heuristics include prior art: U.S. Pat. No. 10,043,157 B2, and Burk, Javed and Balaji: "Apollo: Near-Duplicate Detection for Job Ads in the Online Recruitment Domain", International Conference on Data Mining Workshops 2017.

Many scoring methods have been developed. For example, see prior art U.S. Pat. No. 7,058,628 B1 for scoring based on PageRank in a specific domain of web search engines, and prior art U.S. Pat. No. 7,974,930 B2 for scoring based on characteristics of real estate properties in a specific domain of real estate.

Recent advances in navigation technologies have enabled a creation of an engine for searching or comparing real estate properties using commute duration—see prior art WO 2019164727. For example, given a user request specifying a work location, the technologies rapidly determine accurate travel durations between the work location and every real estate property in a large metropolitan area. This enables a deep search of the real estate market. However, the prior art methods may fall short of achieving an objective of presenting the search results in a useful manner. Such a presentation needs to address the problem of avoiding repetitive information and improving relevance of search results, but in a practical and scalable manner. The invention disclosure teaches a method which achieves the objective.

BRIEF SUMMARY OF THE INVENTION

We present a summary that simplifies the invention, so as to offer the reader some insights into some aspects of the claimed subject matter. The summary is not intended to be a comprehensive overview, and its intention is not to fully delineate the scope of the invention, nor to identify critical or key components of the invention. The purpose of the summary is to outline some concepts in a form that is easier to read for a person of ordinary skill in the art. The reader should consult the invention disclosure for details.

Embodiments of the invention include the following methods.

1. A method for determining an indication of a plurality of sites included in a transportation system using a length of travel and a similarity, the method characterized by:
   (a) receiving a request comprising at least one place included in the transportation system;
   (b) determining at least two isochrone sites included in the plurality of sites,
   wherein a length of travel within the transportation system between each isochrone site and the at least one place is included in a range;
   (c) determining the indication using steps comprising one of:
   i. determining a plurality of similar sites included in the at least two isochrone sites, and determining the indication of the plurality of similar sites, or
   ii. selecting at least one first site that is not similar to at least one second site, both included in the at least two isochrone sites, and determining the indication of the at least one first site and the at least one second site; and
   (d) responding to the request with the indication.
2. A method for determining an overview of a plurality of sites included in a transportation system using a length of travel and a quantity, the method characterized by:
   (a) receiving a request comprising at least one place included in the transportation system;
   (b) computing a sequence of two or more sites included in the plurality of sites, wherein
   i. for a first site and a second site included in the sequence, a length of travel within the transportation system between the first site and the at least one place is at least a range apart from a length of travel within the transportation system between the second site and the at least one place, and
   ii. a quantity associated with a third site included in the sequence is at most a quantity associated with a fourth site included in the plurality of sites, whenever a length of travel within the transportation system between the fourth site and the at least one place is in a neighborhood of a length of travel within the transportation system between the third site and the at least one place;
   (c) determining the overview that includes an indication of the sequence; and
   (d) responding to the request with the overview.
3. A method for determining an indication of at least two alternatives included in a plurality of points of interest included in a transportation system, the method characterized by:
   (a) receiving a request comprising a site included in the transportation system;
   (b) determining the at least two alternatives,
   wherein a length of travel within the transportation system between each alternative and the site is within a threshold of shortest;
   (c) determining an indication of the at least two alternatives that is non-singular and is not a description of travel; and
   (d) responding to the request with the indication.
4. A method for determining an indication of at least two sites included in a transportation system using an estimated length of travel and a length of travel, the method characterized by:
   (a) receiving a request comprising at least one place included in the transportation system;
   (b) determining at least two estimated lengths of travel, including an estimated length of travel within the transportation system between each site included in the at least two sites and the at least one place;
   (c) selecting one or more sites included in the at least two sites using the at least two estimated lengths of travel,
   wherein a number of the one or more sites is at most a predetermined bound;
   (d) determining at least one length of travel, including a length of travel within the transportation system between each site included in the one or more sites and the at least one place;
   (e) determining the indication of the one or more sites using the at least one length of travel; and
   (f) responding to the request with the indication.

Embodiments of the invention also include a computer system and an apparatus that realize any of the above methods.

The embodiments of the invention presented in the invention disclosure are for illustrative purpose; they are not intended to be exhaustive. Many modifications and variations will be apparent to those of ordinary skill in the art, without departing from the scope and spirit of the embodiments.

In the presentation, the terms "the first", "the second", "the", and similar, are not used in any limiting sense, but for the purpose of distinguishing, unless otherwise is clear from the context. An expression in a singular form includes the plural form, unless otherwise is clear from the context. The terms "having", "including", "comprising", and similar, indicate an existence of components or features, and do not preclude other components or features from existing or being added.

BRIEF DESCRIPTION OF DRAWINGS

The drawings included in the invention disclosure exemplify various features and advantages of some embodiments of the invention.

Figure 1:
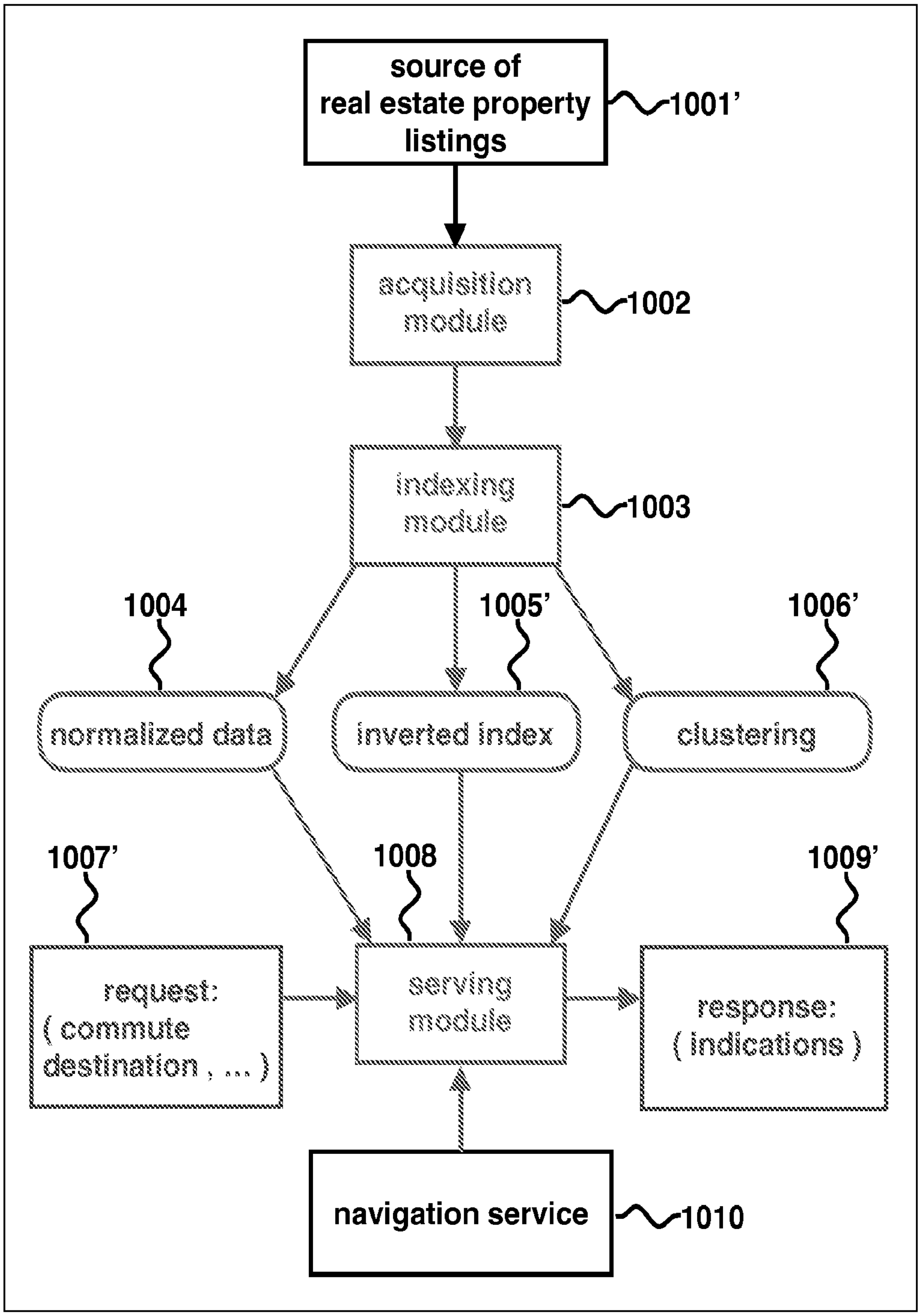
FIG. 1: depicts an example flow of data inside an engine for searching or comparing real estate properties using commute duration.
Figure 2:
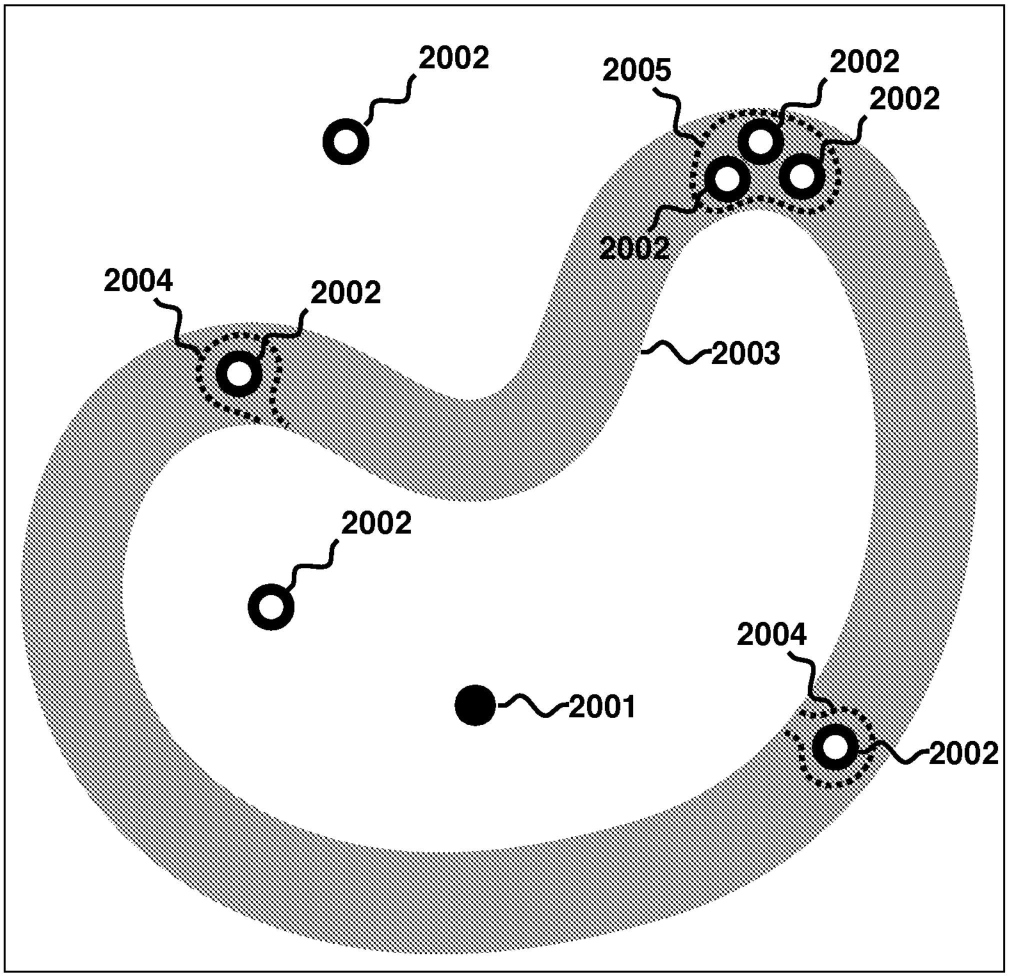
FIG. 2: depicts example clusters of real estate property listings included inside an isochrone.

The drawings are for illustrative purpose only. Other drawings can exemplify the invention, without departing from the scope and spirit of the embodiments, as will be readily recognized by one of ordinary skill in the art.

DETAILED DESCRIPTION OF THE INVENTION

The invention concerns a general case of presenting sites using their similarity and travel duration. However, for the sake of ease of explanation, we first illustrate the invention through an embodiment of an engine for searching or comparing real estate properties using commute duration. For brevity, we simply call it an engine. This illustration is not limiting. In later sections, we explain how the method works in a general case.

1 Exemplary Embodiment

We describe an exemplary embodiment of the invention. In our description, we use the term module. It is known in the art that the term module means a computer system that provides some specific functionality (and so can be viewed as a computer subsystem). In one embodiment, the engine is partitioned into three modules: (1) an acquisition module, (2) an indexing module, and (3) a serving module. Our choice of partitioning the engine into the specific modules is exemplary, not mandatory. Those of ordinary skill in the art will notice that the engine can be partitioned into modules in other manner, without departing from the scope and spirit of the embodiments.

We describe functionality of the modules next. Throughout our description, we make references to illustrations of FIG. 1, FIG. 2, FIG. 3, FIG. 4, FIG. 5 and FIG. 6, where an apostrophe denotes at least one instance of the referred element. We describe the functionality as a sequence of steps in a specific order. However, the order is not limiting. Those of ordinary skill in the art will notice that some steps can be performed in other order, partially concurrently, or can be combined or omitted, without departing from the scope and spirit of the embodiments.

1.1 Acquisition

The acquisition module (1002) obtains information about real estate property listings from at least one source (1001). The sources can be categorized into types, including, but not limited to: (1) direct, corresponding to real estate agents (brokers), landlords, construction companies, etc. who input features of real estate property listings into the acquisition module; or (2) indirect, corresponding to websites, smartphone apps, etc., that publish features of real estate property listings, which get crawled by the acquisition module. Acquisition from the first type source is implemented as a traditional call center, a website, a smartphone app, or the like, having a User Interface that allows its users to input features. Acquisition from the second type source is implemented as a computer system that uses the Internet to visit a source, for example a website or a smartphone app, which itself publishes features. During a visit, the features get scraped. This process is often called crawling. Features of real estate property listings include, but are not limited to, at least one of: a name; an address; a geographical location; a timestamp when the property was put on, or removed from, the market; a floor level; a number of floor levels in a building; a geographical direction of a door; a geographical direction of a window; a characterization of a view from a window; a price amount; a rent amount; a deposit amount; a lender information; a loan information; a mortgage information; a monthly management fee; a description of what is covered by a monthly management fee; a move-in date; a square meter area; a square meter area of the land; a price per unit of area, such as per square meter; a number of bedrooms; a number of bathrooms; a structure or a layout characterization; a heating or a cooling method; a description of an elevator; a description of parking; a description of a swimming pool; a description of a garden or a backyard; a description of a child playground; a description of a gym; a textual description of the property written by the landlord or the agent; an image of the interior, the exterior, or a view from a window; a tour movie of the interior; a recording of sound or noise through an open window; a measurement of air quality; a description of an agent; a rating of an agent; or an identifier assigned by the source to the real estate property listing. In one embodiment, the acquisition module also obtains information about points of interest, that are related to real estate property listings via travel, both being included in a transportation system. Any point of interest is an arbitrary location. The points of interest, and their example information, include, but are not limited to, at least one of: a school (example information: a type of a school (public, private, daycare, elementary, middle, high, university, . . . ), a rank of a school among other schools, a tuition, an admission criterion, a probability of admission, or a geographical area of the zone of the school), a workplace (example information: a job description, or a salary information), or an amenity (for example: a public transportation stop, a highway entrance, a parking lot, a senior citizen center, a park, a hospital, a clinic, a pharmacy, a restaurant, a shop, a convenience store, a laundry service, a bank, an ATM, a government office, a crime report, a police station, or a military base). In one embodiment, the information obtained by the acquisition module is stored in a non-transitory storage medium (e.g., a database). In one embodiment, the process of acquisition can be interpreted as an act of measuring the real world, wherein the measuring acquires information about physically existing entities described above. A physical existence may be in a form of data about an entity stored by a source in a non-transitory storage medium. Many other ways of obtaining real estate property listings will be apparent to one of ordinary skill in the art, without departing from the scope and spirit of the embodiments.

In one embodiment, the acquisition module operates continuously, thereby creating a view of the real estate market that evolves over time. At a point in time, there may be more than one listing associated with a physically existing house, for example because the listings originated from several sources. These multiplicities may have conflicting information, for example two different square meter areas that were input by two confused real estate agents. A listing created at one time, may be modified later, for example when a landlord edits the description of the property, uploads new images of the property, etc. A listing may be deleted, or reinstated, for example when a potential tenant cancels a lease. A listing may have intentionally vague information, for example when the landlord prefers to conceal private information, for example by providing a range for a geographical location of the listing, for example a 100-meter disk, or a range for a floor level inside a building, for example a "high floor". A listing may be obsolete, for example when a real estate property already got sold, but the sale is not yet reflected on any of the sources. There may be fake listings created to deceive potential tenants, or malicious listings that intentionally distort features.

1.2 Indexing

The indexing module (1003) normalizes data obtained by the acquisition module into a form that can be stored in a non-transitory storage medium. In one embodiment, the form represents a real estate property listing as a feature vector, each feature associated with a value. A data type of a value includes, but is not limited to, any of: text, number, image, movie, sound, or scent. A value is appropriately encoded into a computer-accessible form. For example, a price range can be represented as two features with numeric values denoting: a high price and a low price. In one embodiment, a non-numeric value is mapped to a number. For example, a feature "elevator" has two possible values: "available" and "unavailable", which get mapped to a value 1 and 0 respectively. In one embodiment, a resulting feature and its numeric value get added to the feature vector. In one embodiment, we add a new feature and a numeric value, for each non-numeric value of a feature. In one embodiment, a feature and its value are computed using at least one other feature and its value. For example, a unit price is computed by dividing a value of price by a value of area, or a value is computed by an artificial intelligence software executed on features and values by a computer system. In one embodiment, a feature has a value that is a timestamp indicating the moment when the specific real estate property listing was obtained by the acquisition module. In one embodiment, the feature vector is sparse, in the sense that some features may be missing for a real estate property listing, but may be present for other real estate property listing. For example, not every real estate property listing has an image of a bathroom. In one embodiment, a feature vector is represented as a hash map, or a list. In one embodiment, the indexing module reconciles conflicting information, for example using a majority voting, averaging, and so on. Many other ways to normalize data will be apparent to one of ordinary skill in the art, without departing from the scope and spirit of the embodiments.

Normalization is implemented as a module, that is customized for a specific source. The module is built by a human who researches the source, so as to appropriately interpret the meaning of the data obtained from the source. Once completed though, the module runs automatically without human supervision.

In one embodiment, the indexing module builds at least one inverted index (1005) of real estate property listings. Later, during request processing, a precomputed inverted index allows to quickly identify real estate property listings whose specific feature has a specific value. For example, an inverted index enables a quick identification of all real estate property listings that have exactly 3 bedrooms. In one embodiment, an inverted index is implemented as: a hash map, a sorted list, among others. In one embodiment, the indexing module builds an inverted index for any feature, for example, for each feature that commonly occurs in user requests, for example: a price, a number of bedrooms, a number of bathrooms, a square meter area, and so on. Many other ways to build at least one inverted index will be apparent to one of ordinary skill in the art, without departing from the scope and spirit of the embodiments.

In one embodiment, the indexing module builds at least one clustering (1006) of real estate property listings. Precomputed clusters are useful, because they help identify similar listings during request processing. A clustering uses a notion of similarity, for example one of the notions of similarity mentioned in the invention disclosure. In one embodiment, the module builds a clustering of real estate property listings using geographical distance. For example, the module reads from a non-transitory storage medium the feature vectors associated with real estate property listings. The geographical locations represented in the feature vectors are clustered using a greedy approach. For example, locations are processed in an arbitrary order, and a location creates a new singleton cluster, if the location cannot be added to any previously created cluster, without exceeding a cluster radius, for example set to 10 meters. Then, the real estate property listings are assigned to clusters based on the clusters of the geographical locations. In one embodiment, the indexing module builds a clustering using a similarity defined on any feature, for example, on each feature that commonly occurs in user requests. In one embodiment, the indexing module builds a clustering using a similarity defined on two or more features, for example only listings that match on both price and area are considered similar. Many other ways to build at least one clustering will be apparent to one of ordinary skill in the art, without departing from the scope and spirit of the embodiments.

In one embodiment, an inverted index or a clustering is restricted to listings obtained by the acquisition module within a period of time, for example past 24 hours. In one embodiment, a period of time is wide, such as several years, for example to help identify trends in values over time. In one embodiment, an inverted index or a clustering is restricted to listings that correspond to properties that are on the market.

In one embodiment, the indexing module also operates on points of interest, in a manner that is analogous to the above-described manner of operating on real estate property listings.

In one embodiment, normalized data, an inverted index or a clustering gets saved into a non-transitory storage medium.

In one embodiment, the indexing module operates continuously, thereby maintaining views of normalized data, inverted indexes, and clusterings that evolve over time.

1.3 Serving

The serving module receives a request, generates an indication, and responds to the request with the indication. We describe several embodiments next.

1.3.1 Indication

The serving module (1008) receives requests (1007) from users. A request contains a specification of at least one commute destination (2001) (3002). A commute destination is an arbitrary location, for example: a geographical location, an address, or a point of interest. The request also includes parameters which determine a manner in which the at least one commute destination forms at least one commute path. A commute path is a sequence of travel between pairs of endpoint locations. A commute path begins or ends at a real estate property, and includes a commute destination. A commute path may form one of many shapes, for example: a roundtrip commute path (e.g., home, then work, then home, or home, then a school that is nearest the home, then home), an open-jaw commute path (e.g., home, then a school whose zone includes the home, then a piano class, then home), or a disconnected commute path (e.g., home, then work, then other home). Other manners to form a commute path will be apparent to one of ordinary skill in the art, without departing from the scope and spirit of the embodiments. Other parameters may be included in the request, for example: a time of departure, an arrival deadline, a probability of arrival before the deadline, a means of travel (car, bus, subway, walk, a combination, etc.), or a frequency of travel. For example, a workplace is visited five times per week, and a school is visited three times per week. Other parameters may include a filtering restriction, which restricts travel, for example: what kind of vehicles should be used for travel; a maximum number of transfers; an allowed type of transfer (e.g., a subway-bus transfer, or a bus-subway transfer); a time window for a transfer; a limit on a walk duration; or a restriction on which point of interest can be included in a commute path (for example, only a school in the best 10 percent of a school ranking). Given a specific real estate property, we can determine a travel duration for the at least one commute path. We will simply refer to the result as: a travel duration between the real estate property and the at least one commute destination. In one embodiment, a travel duration between a real estate property and the at least one commute destination, is a numeric value that reflects an aggregate amount of time that all inhabitants of the real estate property expend on travel during a period of time, for example daily, weekly, monthly, and so on. These inhabitants may correspond to: a family living in the real estate property, roommates, coworkers in an office, and so on. Other parameters may include financial information about the user, for example: a statement of financial assets, a credit rating, an income information, such as an hourly rate, a job category, a job compensation information, a mortgage application; or school information about the user, for example: a school admission questionnaire, for example containing a grade in a mathematics exam. The request may also contain a specification of the desired features or their values of a real estate property (3001), for example an area in the range between 80 and 90 square meters, or desired features or their values of a point of interest. Many other forms of a request will be apparent to one of ordinary skill in the art, without departing from the scope and spirit of the embodiments.

Then the serving module identifies real estate property listings L (2002) that match parameters of the request. For example, when the specification of the desired features says "an area in the range between 80 and 90 square meters", then the module identifies all listings that have the area in the range between 80 and 90 square meters. In one embodiment, the process of identification uses inverted indexes constructed by the indexing module, for example by intersecting the sets of identifiers of listings, each set associated with a desired feature and its values specified in the request. In one embodiment, the identification is restricted to listings that the acquisition module has obtained within a past period of time, for example past 24 hours. In one embodiment, the identification is restricted to listings that correspond to properties that are on the market. In one embodiment, L includes all real estate property listings. Many other ways to identify matching real estate property listings will be apparent to one of ordinary skill in the art, without departing from the scope and spirit of the embodiments.

The serving module then determines at least one travel duration between each geographical location of the listings L, and the at least one commute destination, using any manner known to one of ordinary skill in the art, for example using a prior art navigation service (1010) mentioned in the invention disclosure. For example, for a specific geographical location H of a real estate property listing, a specific geographical location of a workplace, and a specific geographical location of a school, a navigation service computes a duration $D_w$ of travel from H to the workplace and back to H, and a duration $D_s$ of travel from H to the school and back to H. Then, a travel duration between the real estate property listing and the at least one commute destination is $D_w+D_s$, that includes a contribution $D_w$ and a contribution $D_s$. In one embodiment, a travel duration is derived from other travel durations. For example, a travel duration is a weighted sum, for example $(5\cdot D_w+3\cdot D_s)/(5+3)$ based on travel frequency. In other example, a travel duration is a difference between travel durations, for example, a travel duration for the current home (included in the request) minus a travel duration for a candidate new home (included in the listings L). In one embodiment, a travel duration is a shortest travel duration, for example computed using the Dijkstra's algorithm on a graph that models the transportation system, the graph is constructed using a prior art method mentioned in the invention disclosure. In one embodiment, a travel duration is an estimated travel duration, for example within a multiplicative factor or an additive summand away from a shortest travel duration, for example a factor 2 or a summand 15 minutes or 1000 meters (such a characterization of an estimated travel duration corresponds to a travel duration computed using: a method described in the invention disclosure or in a prior art mentioned in the invention disclosure). In one embodiment, a navigation service determines travel durations using a method of any of the following prior art, that describe:

(a) representatives, which are locations that frequently occur in shortest travels, as in WO 2019164727, representatives can be characterized as: locations included in a transportation system, wherein a number of representatives is at most a size of the transportation system multiplied by a predetermined ratio that is at most 1, examples of representatives include:
  (i) landmarks, portals, hubs, beacons, seeds, transit nodes, among other, as in Sommer: "Shortest-Path Queries in Static Networks", ACM Computing Surveys, Vol. 46(4) 2014,
  (ii) transit stations, and global stations where a transfer is likely to occur at during long connections, as in U.S. Pat. No. 8,756,014 B2,
  (iii) centers of a grid, as in CN 105975627 A, or
  (iv) boundary vertices, as in U.S. Pat. No. 9,222,791 B2;

(b) processed graph data comprising nodes representing pre-filtered map features, as in U.S. Pat. No. 9,250,075 B2;
(c) a reduced road graph, as in U.S. Pat. No. 9,195,953 B2;
(d) a hierarchy of polygon layers, as in U.S. Pat. No. 7,953,548 B2;
(e) a grid, as in CN 105975627 A;
(f) a subgraph obtained by excluding at least one way-point, as in U.S. Pat. No. 8,949,028 B1;
(g) one or more settled nodes, as in EP 2757504 A1;
(h) a forward partial path and a backward partial path, as in EP 1939590 B1;
(i) an overlay graph, as in U.S. Pat. No. 9,222,791 B2;
(j) an intermediate way-point, as in US 20110251789 A1; or
(k) transfers between a source station that is, or is nearby, a source location and a target station that is, or is nearby, a target location, as in U.S. Pat. Nos. 8,417,409 B2, 8,738,286 B2, 8,756,014 B2, 10,533,865 B2, KR 101692501 B1, or CN 104240163 A;

or any method know in the art, including:
(l) contraction hierarchies, as in Geisberger, Sanders, Schultes and Delling: "Contraction Hierarchies: Faster and Simpler Hierarchical Routing in Road Networks", Workshop on Experimental and Efficient Algorithms 2008, or Delling, Goldberg, and Werneck: "Faster Batched Shortest Paths in Road Networks", Workshop on Algorithmic Approaches for Transportation Modeling, Optimization, and Systems 2011;
(m) techniques based on CRP, GRASP and PHAST, as in Baum, Buchhold, Dibbelt and Wagner: "Fast Exact Computation of Isocontours in Road Networks", ACM Journal of Experimental Algorithmics, October 2019;
(n) techniques listed by a survey paper by Sommer: "Shortest-Path Queries in Static Networks", ACM Computing Surveys, Vol. 46(4) 2014; or
(o) techniques listed by a survey paper by Bast, Delling, Goldberg, Miiller-Hannemann, Pajor, Sanders, Wagner and Werneck: "Route Planning in Transportation Networks", Algorithm Engineering 2016.

In one embodiment, the serving module determines travel durations for geographical locations of listings before L is identified, stores the travel durations in a non-transitory computer-readable storage medium, and retrieves a travel duration from the storage medium after a location in L has been identified. In one embodiment, the serving module determines travel durations for a subset of listings, for example only for listings within a neighborhood of a metropolitan area, for example within a radius of 500 meters, or 1 minute of travel, from a preset location. Various ways of selecting a subset are described in the invention disclosure. Many other ways to determine travel durations will be apparent to one of ordinary skill in the art, without departing from the scope and spirit of the embodiments.

The serving module then groups the listings L using proximity of travel durations. A group is related to the concept of an isochrone, which is a line on a map that connects points having the same travel duration from a given location. However, we use the concept of an isochrone (2003) in a broad sense that conveys a range. In one embodiment, the range is set to a short travel duration, such as 15 minutes. In one embodiment, the range is set to a small distance, such as 500 meters. In one embodiment, the range includes at least two values. For example, the serving module considers consecutive ranges of time of width M minutes: that is [0, M), [M, 2M), [2M, 3M), and so on, for example where M is set to 15. A group i is associated with a range [iM, (i+1)M). Then, when D is a travel duration between a geographical location of a listing and the at least one commute destination, then the listing is assigned to a group i whose associated range includes D. In other example, a group comprises a limited number of listings that appear consecutively within an order of listings sorted by the travel duration, for example at most 1000 listings per group. In that case, the ranges may have different widths. In one embodiment, a group includes real estate property listings without any geographical restriction, for example a house 1 hour drive East from work and also a house 1 hour drive West from work (2004). In one embodiment, a group includes real estate property listings restricted to a neighborhood (2005) of a metropolitan area, for example within a radius of 500 meters, or 1 minute of travel, from a preset location. In one embodiment, some ranges overlap. In one embodiment, a group is computed that corresponds to an isochrone that encompasses a range of travel durations, for example a predetermined range, or a range specified in the request. Many other ways to group listings using proximity of travel duration will be apparent to one of ordinary skill in the art, without departing from the scope and spirit of the embodiments.

The serving module then determines clusters of similar listings within any group (2004) (2005). In one embodiment, the serving module uses any notion of similarity mentioned in the invention disclosure. In one embodiment, clusters are determined using any clustering method mentioned in the invention disclosure. A cluster may comprise just one listing, for example when there is no other similar listing, or a cluster may comprise a plurality of listings. In one embodiment, similarity is affected by the user, for example the request may say: "ignore multiple agents", in which case listings showing different agents, but advertising an otherwise similar house, will be considered similar. In one embodiment, precomputed clusters are used to accelerate clustering during request processing, for example listings are pre-clustered using textual features using precomputed clusters, and then each pre-cluster is clustered using similarity affected by the user. Many other ways to determine clusters for a group will be apparent to one of ordinary skill in the art, without departing from the scope and spirit of the embodiments.

The serving module determines scores of listings or clusters of listings. A score is an entity that can be compared to other score, so that an order can be established. For example, a score is a numeric value compared using "greater-than". In one embodiment, a score of a listing uses at least one feature and its value, examples include: travel features (for example: a travel duration between a geographical location of a listing and the at least one commute destination, etc.), point of interest features (for example, features and values of the points of interest included in the at least on commute destination, such as a rank of a school), location features (for example: incidences of crime, availability of schools, local services, amenities, etc.), monetary features (for example: Market Standard Values, price increase or reduction, etc.), reputation features (for example: prior leases brokered by the real estate agent, feedback of prior buyers, etc.), and temporal features (for example: how many days a listing has been on the market, etc.). In one embodiment, a score is defined as a "characteristic" listed in prior art U.S. Pat. No. 7,974,930 B2. In one embodiment, a score is computed by an artificial intelligence software executed by a computer system, that was trained on past interactions of the user with the serving module, such as on clicks on web links associated with features, values and requests, that serve as ground truth for predicting a score. In one embodiment, a score is determined using an arbitrary mathematical formula. For example, a score of a listing is a weighted sum of values of its numeric features. A weight can be positive, negative, or zero. In one embodiment, we use equal weights. In one embodiment, weights are determined, so as to give each feature an equal opportunity to affect the score, for example: we use a low weight for a feature that has a high median value across all listings. In one embodiment, we use weights that promote a specific feature, for example: we use a higher weight for a monetary feature, or a higher weight for a more recent listing. In one embodiment, a score is affected by the user, for example the request may say: "order by the construction date", or "prefer a top school rank", in which case scores of relevant listings will be increased, for example by adjusting weights appropriately. In one embodiment, a score of a cluster of listings is a mathematical statistic of scores of listings in the clusters, for example: a maximum score of any listing in the cluster, or a weighted sum of values of numeric features in the cluster. In one embodiment, a score is a vector whose coordinates are computed using at least one feature and its value, for example: a two-dimensional vector, whose first coordinate is a negated travel duration, and whose second coordinate is computed using features and their values, as above. In one embodiment, such vectors are ordered lexicographically. In one embodiment, a score is a text, for example the name of the apartment community, ordered alphabetically. Many other ways to determine scores will be apparent to one of ordinary skill in the art, without departing from the scope and spirit of the embodiments.

The serving module selects clusters. In one embodiment, the module selects a number of clusters with the highest score, for example top 20 clusters. In one embodiment, the module selects a number of clusters that satisfy at least one additional requirement. In one embodiment, an additional requirement is to select clusters for a range of travel durations, for example for a range [0, M). In one embodiment, an additional requirement is to select at most a certain number of clusters, for example at most 5 clusters. In one embodiment, an additional requirement is geographical sparsity of the selected clusters, for example by selecting at most a preset number of clusters in any neighborhood. For example: by greedily processing the clusters in an order of the score, highest score first, and preventing a cluster from being selected, if more than a threshold of clusters have already been selected in its neighborhood, for example more than 2 clusters within 500 meters, or 3 minutes of travel. In one embodiment, an additional requirement is that the selected clusters have different values of features. For example, by selecting a 2-bedroom apartment and a 3-bedroom apartment. In one embodiment, diversity is ensured by greedily processing the clusters, and precluding a selection of a cluster whose specific feature has a value that is similar to a value of the feature in already selected clusters. In one embodiment, an additional requirement is specified in the request. For example, the request may require listings in specific school zones. In one embodiment, the module selects clusters, using any clustering method mentioned in the invention disclosure, where the clustering method operates on items, each of which is a cluster. For example, the clustering method determines an item that is a centroid, and the item becomes a selected cluster. Many other ways to select clusters will be apparent to one of ordinary skill in the art, without departing from the scope and spirit of the embodiments.

In one embodiment, the serving module determines an indication of at least one listing in a cluster, and responds (1009) to the request with the indication. The cluster is determined using a similarity among listings and a travel duration between a geographical location of a listing and at least one commute destination, for example as described above. An indication includes, but is not limited to, at least one of:

(a) a listing that has the highest score in the cluster;
(b) a position (3007), with respect to score, of a listing in the cluster;
(c) a travel duration (3003), (3004) for a listing;
(d) a part of a travel duration, for example a walk duration included in travel by public transportation;
(e) a snippet (3005) of a listing, that is a textual representation of the listing;
(f) a web link (3006) to a listing published by a source;
(g) at least one feature and its value (3005) for a listing;
(h) a mathematical statistic of values, for example: (i) a histogram of values of a feature, (ii) a frequency statistic, such as a most frequent value of a feature, or a least frequent value of a feature, (iii) a random sample of values of a feature, (iv) a maximum or a minimum of numeric values, (v) an average, a median, a percentile, a standard deviation, or a variance of numeric values, or (vi) a fraction of numeric values that are in a range, such as lower than a threshold, or higher than a threshold;
(i) a mathematical statistic based on a period of time, for example a trend in price over the past 5 years;
(j) a summary of any one listing in the cluster;
(k) a summary of at least two listings in the cluster, for example: (i) a number of listings (3007), or (ii) an indication of a difference between two listings, for example showing that one has a lower price or showing that one was posted by a more trustworthy agent;
(l) a combined listing, which is constructed by combining features and values of at least two listings in the cluster, for example: presenting phone numbers of all real estate agents who advertise the specific house, but presenting a number of bedrooms of the specific house just once;
(m) a graphical representation, or a textual representation, of the cluster; or
(n) correspondingly any of the above, but regarding a point of interest included in the least one commute destination.

In one embodiment, an indication of the selected clusters is determined, which includes an indication of at least one listing, for each of the selected clusters. In one embodiment, an indication of an arbitrary set of real estate listings is determined, in the above manner in which an indication of at least one listing in a cluster was determined. For example, by including a mathematical statistic of a price of listings currently on the market, or a mathematical statistic of a price of listings that match the user request. Many other ways to determine an indication will be apparent to one of ordinary skill in the art, without departing from the scope and spirit of the embodiments.

In one embodiment, we explicitly restrict an indication of at least one listing (e.g., of all listings included in an isochrone), so that the indication does not include any information other than that explicitly recited by a limitation. The limitations include any of the above indications of at least one listing, but with an added qualifier "only", for example:

(a) only a snippet of a listing with a highest score among the at least one listing, (b) only a combination of two of the indications, or (c) only a combination of k of the indications, for a $k \geq 3$.

This achieves an advantageous effect, because a limitation decreases the information overload placed onto the user, and increases relevance. For example, presenting only one listing among all listing that have travel duration between 10 minutes and 20 minutes, imposes a small cognitive load onto the user, while offering a useful piece of information to the user.

In one embodiment, the serving module responds (1009) to the request with an indication of at least two clusters that are not similar. For example, the method selects two clusters whose distance is at least a threshold. A notion of a distance between clusters is known in the art, for example: a minimum distance between any pair of listings from the two clusters, or a distance between centroids of the two clusters. An example threshold is 1000 meters, or 1 minute of travel. And then the method determines an indication of the two clusters. This helps create a response to the request that is diverse. The at least two clusters are determined using similarity among listings and travel duration between a geographical location of a listing and at least one commute destination, for example as described above. Hence, a first listing in one cluster can be considered not similar to a second listing in other cluster. In one embodiment, the travel durations are within a range, but in other embodiment, the travel durations are not required to be within a range. Many other ways to respond with an indication of at least two clusters will be apparent to one of ordinary skill in the art, without departing from the scope and spirit of the embodiments.

1.3.2 Overview

In one embodiment, the method determines an overview of real estate property listings using a quantity associated with each listing and travel durations. One advantageous effect of the overview is an ability to help the user find a listing that strikes a personalized balance between the quantity and the travel duration. We describe one embodiment, where the quantity is interpreted as the sale price. This interpretation is not limiting. Other interpretations of the quantity will be apparent to one of ordinary skill in the art, without departing from the scope and spirit of the embodiments. In order to simplify a description of how an overview is determined, we will refer to individual listings. However, it should be understood that each such individual listing may correspond to a cluster of similar listings determined according to a method described in the invention disclosure. Each travel duration mentioned in the description is between a real estate property and the at least one commute destination.

In one embodiment, the method computes a sequence of listings that is required to be short, have diverse travel durations, and achieve low values of the quantity compared to listings with neighboring travel durations. In one embodiment, the computation begins with listings L that match the desired features. In one embodiment, the computation is performed using a greedy method. For example:

(a) the method considers listings U that have sale prices, and orders the listings by the sale price, lowest sale price first;

(b) then the method processes the listings in the order of the sale price;

(c) during the processing, the method selects a next listing $\ell$, and excludes from subsequent processing any listing whose travel duration is within a range of the travel duration of $\ell$;

(d) then the method repeats step (c), until there is no more listing to process.

This computation yields some number $k \geq 1$ of listings. The number k depends on how wide, or how narrow, the range is. For example, the range is set to 15 minutes, or 1000 meters. We sequence the computed listings as $\ell_1$, $\ell_2$, $\ell_3$, . . . , $\ell_k$, in an increasing order of travel durations. For example: $\ell_1$ (4001) has a travel duration of 5 minutes, and a sale price of 1 million USD; $\ell_2$ (4002) has a travel duration of 14 minutes, and a sale price of 1.2 million USD; $\ell_3$ (4003) has a travel duration of 25 minutes, and a sale price of 0.7 million USD; and so on. Because of the manner in which the listings were computed, we know that for each $\ell_i$, there is no listing with a lower sale price, whose travel duration is in a neighborhood of the travel duration of $\ell_i$. The neighborhood includes a range of travel durations at most the travel duration of $\ell_i$, or a range of travel durations at least the travel duration of $\ell_i$. The neighborhood can include both ranges. This characterization of neighborhood depends on long monotonic runs of the sale price along the travel duration. For example, in the above example, $\ell_1$ is a cheapest listing of any real estate property that has a travel duration in a neighborhood of 5 minutes. In one embodiment, we compute a sequence of listings with relaxed requirements on travel duration or quantity. For example, we select at most a threshold of listings in a range of travel durations, for example at most 5 listings. For example, we select at most a threshold of listings with a lowest value of the quantity in a neighborhood, for example at most 5 listings. In one embodiment, the computed listings are sequenced arbitrarily (thus, $\ell_1$, $\ell_2$, $\ell_3$, . . . , $\ell_k$ does not necessarily follow an increasing order of travel durations; for example follows a decreasing order, or a monotonic order of the quantities associated with the computed listings). Many other ways to compute a sequence of listings will be apparent to one of ordinary skill in the art, without departing from the scope and spirit of the embodiments.

In one embodiment, the method determines an indication of the computed listings $\ell_1$, $\ell_2$, $\ell_3$, . . . , $\ell_k$. An indication of a cluster was described in the invention disclosure, and there is a corresponding indication of $\ell_1$, $\ell_2$, $\ell_3$, . . . , $\ell_k$, as easily seen by one of ordinary skill in the art, without departing from the scope and spirit of the embodiments. For example, the indication includes a sale price and a snippet, for each computed listing. In one embodiment, the indication includes a mathematical statistic about sale prices across listings whose travel duration is within a range from a travel duration of $\ell_i$. Example mathematical statistics were described in the invention disclosure, for example a 10th percentile, 50th percentile, and 90th percentile. This gives the user an idea what kind of sale prices are available for listings whose travel durations are comparable to the travel duration of $\ell_i$. In one embodiment, the indication includes a mathematical statistic of the sale prices across the listings U. This gives the user an idea what kind of sale prices are available on the market in general. For example, the user can see what is considered cheap (e.g., 10th percentile) (4004) and what is considered expensive (e.g., 90th percentile) (4005), among 2-bedroom apartments currently available on the real estate market of a metropolitan area.

The computed listings $\ell_1$, $\ell_2$, $\ell_3$, . . . , $\ell_k$ can be viewed as "first level" listings, meaning that they give an overview of the lowest sale prices based on travel duration. In one embodiment, the method computes "second level" listings (4006). For an i, the method considers $\ell_i$ and its next $\ell_{i+1}$, and their associated travel durations $d_i$ and $d_{i+1}$. Then the method considers a subset $U_i$ of listing U, whose travel duration is between $d_i$ and $d_{i+1}$. Then the method determines an indication of $U_i$, using any method described in the invention disclosure, for example, a method for selecting clusters. For example, an indication of $U_1$ includes a small number, such as at most 10, of geographically dispersed listings whose travel duration is between 5 minutes and 14 minutes, and that have the lowest available sale price among the listings in that range of travel durations. An indication of $U_i$ may include a mathematical statistic about $U_i$. The edge-case sets are defined as: $U_0$ has all listings in U with travel duration less than $d_1$, and $U_k$ has all listings in U with travel duration at least $d_k$; in one embodiment, the edge-case sets are further restricted to be within a range of travel durations. A set $U_i$ may be empty, for example when there is no listing that matches the desired features, that has travel duration between $d_i$ and $d_{i+1}$. Thus, the "second level" may be uneven. In one embodiment, the method computes "second level" listings by subdividing travel durations and computing sequences. In one embodiment, the method computes "third level" listings, and so on, by further subdividing travel durations.

Figure 4:
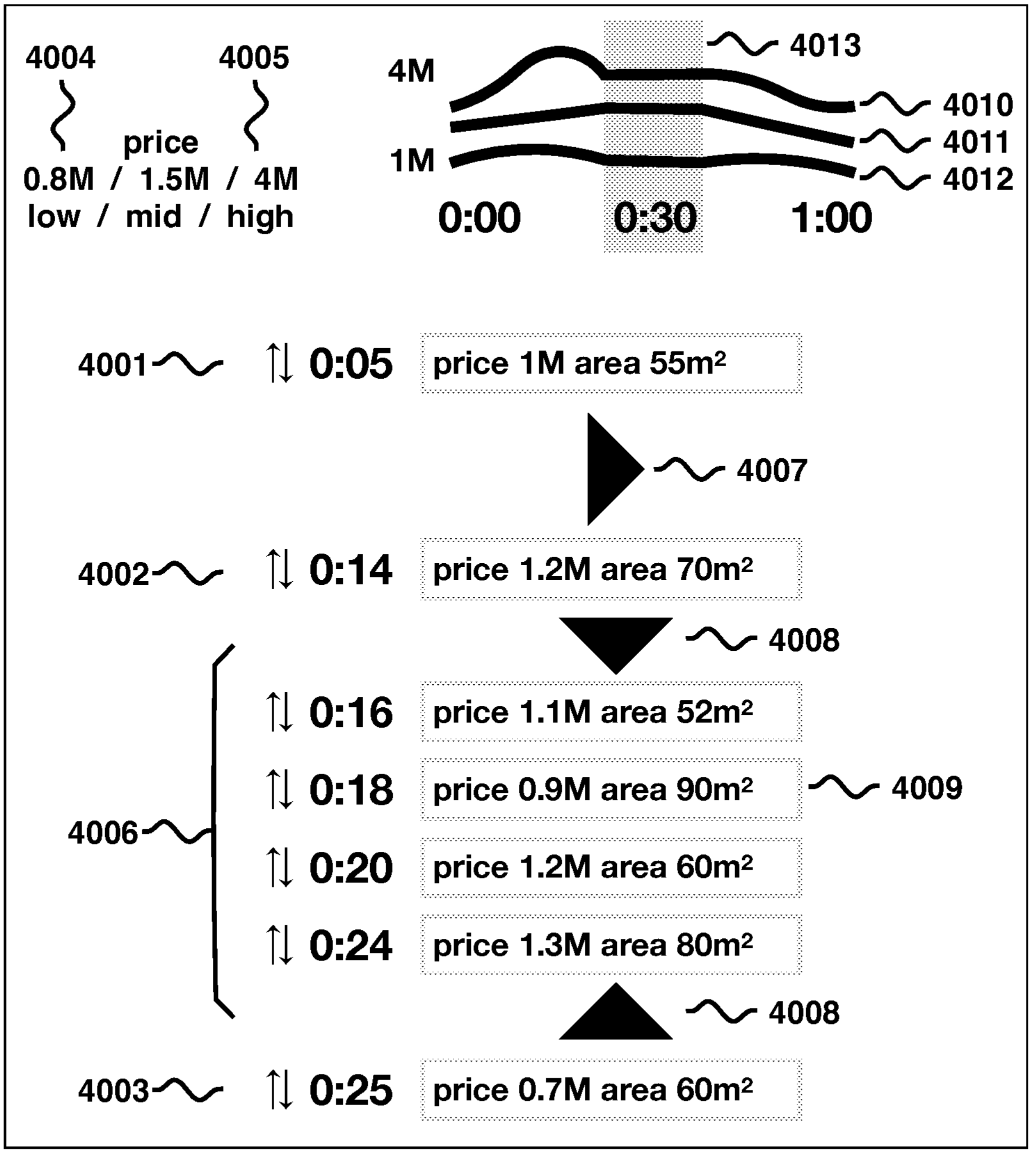
FIG. 4: depicts an example overview included in a User Interface.
Figure 5:
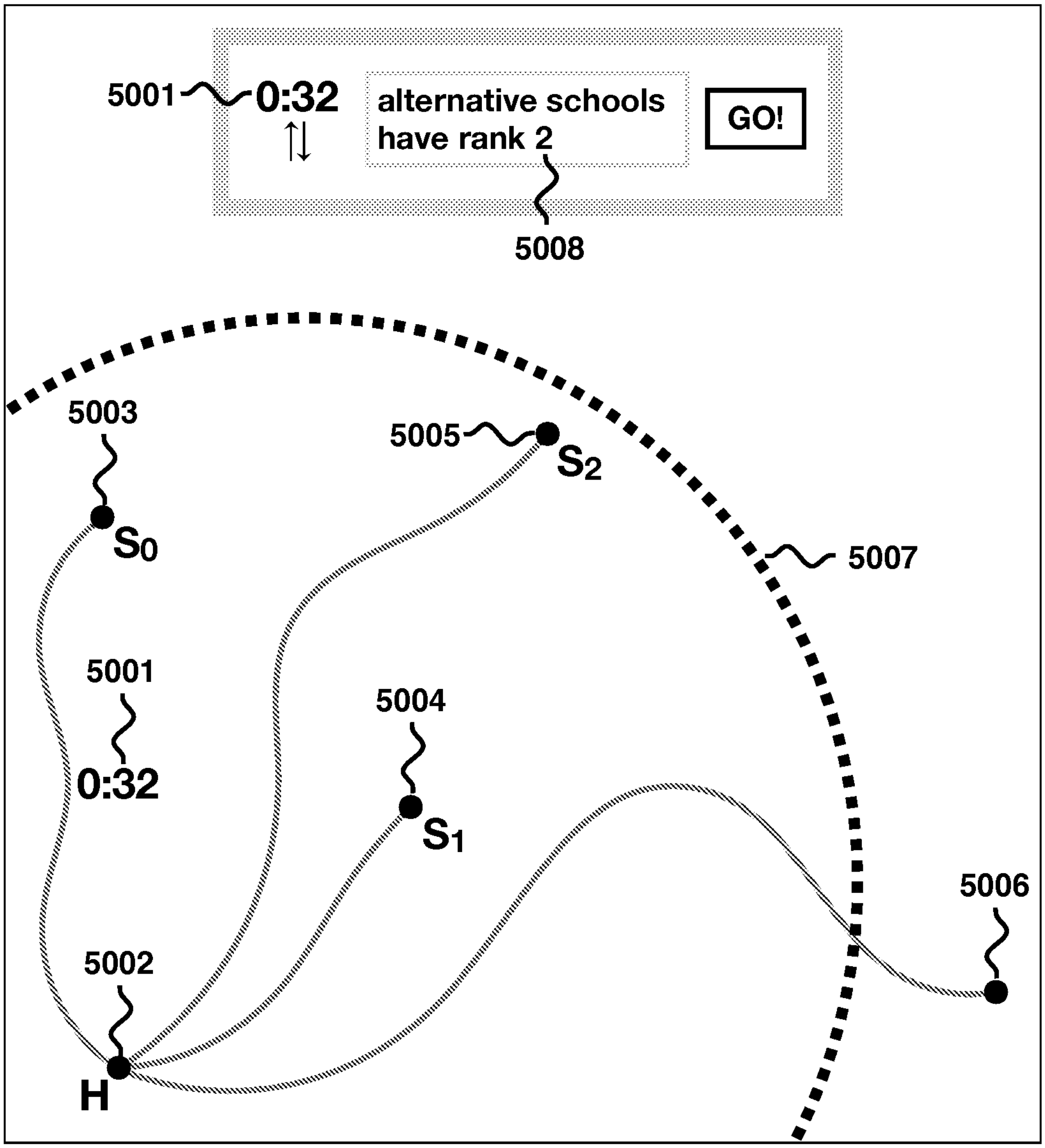
FIG. 5: depicts example steps of determining an indication of alternative schools included in a User Interface.
Figure 6:
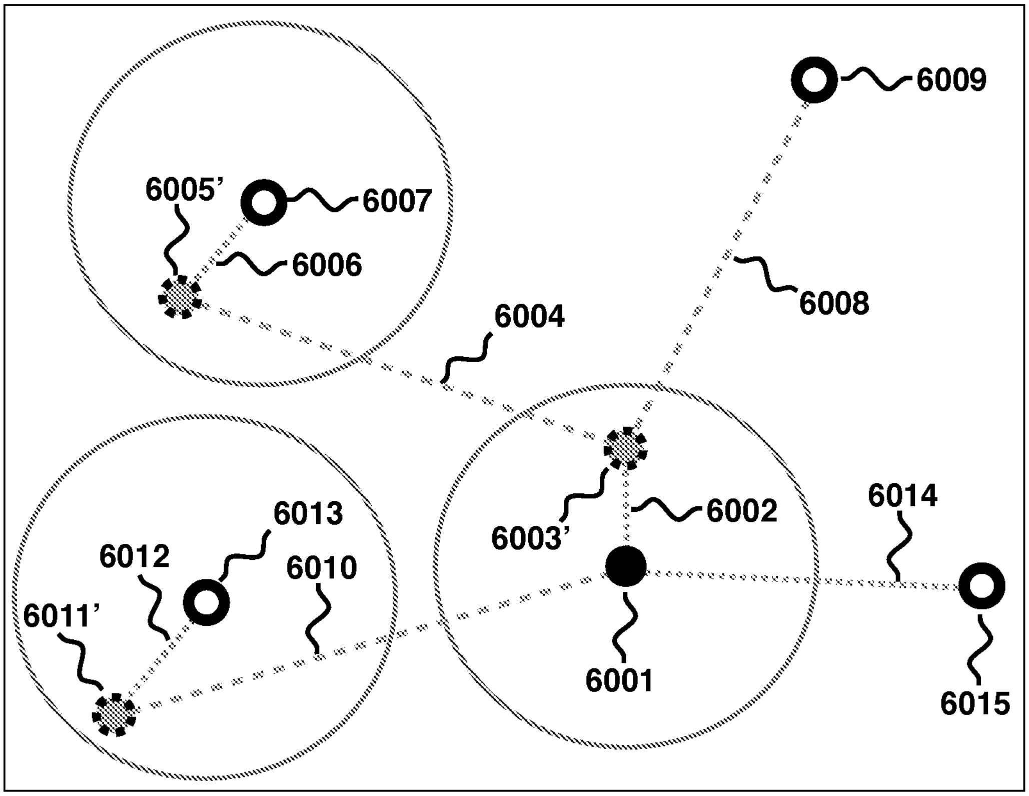
FIG. 6: depicts example steps of a two-phase approach for determining travel durations.

In one embodiment, the method determines an overview that is a graphical representation of a relation between a sale price and a travel duration. In one embodiment, a graphical representation depicts a mathematical statistic of sale prices associated with each range of travel durations. For each range of travel durations, the method determines a mathematical statistic of sale prices, and generates a shape that encodes the mathematical statistic, for example: a point, a line, an oval, a rectangle, a range bar, and so on. A graphical representation has many forms, including, but not limited to: a plot, a histogram, a pie chart, and a heat map. For example, a plot includes: a horizontal axis that corresponds to the travel duration, a vertical axis that corresponds to the sale price, and a rendering of a mathematical statistic of sale prices associated with listings in each range of travel durations. For example: (4010) represents the 90th percentile of the sale price, (4011) represents the median of the sale price, and (4012) represents the 10th percentile of the sale price. For example, FIG. 4 shows that the 10th percentile of the sale price is 1 million USD, among listings whose travel duration is in a range that includes 30 minutes. Many other ways to determine a graphical representation of a relation between a sale price and a travel duration will be apparent to one of ordinary skill in the art, without departing from the scope and spirit of the embodiments.

In one embodiment, the method enables navigation. The method is executed by a device. The device displays an indication of the "first level" listings. The user can interact with the device. For example, the user can interact (tap on, hoover a mouse over, perform a gesture, such as a touch, a swipe, a touch-and-hold on a display screen that is sensitive to touch, etc.) with a User Interface element (4007), and in response the device displays an indication of appropriate "second level" listings, or interact with a User Interface element (4008) to hide the indication. As a result, the user is presented with a compact overview of lowest sale prices, and the user can drill in and out the overview, so as to explore the tradeoffs between sale prices and travel durations. In one embodiment, a presentation of the listings is: linear (e.g., a list) and the user can scroll the presentation up and down, circular (e.g., a list folded into a circle) and the user can rotate the presentation, in a reversed order, and so on. In one embodiment, the locations of "second level" listings are rendered on a map during the time when the "second level" listings are displayed. In one embodiment, locations of other listings are hidden from the map, during the time when the "second level" listings are displayed. In one embodiment, the user interacts with a graphical representation. For example, the user taps on a User Interface element (4013), and in response the device displays an indication of listings whose travel duration is in a range associated with the element. Many other ways to navigate will be apparent to one of ordinary skill in the art, without departing from the scope and spirit of the embodiments.

The method uses other ways to compute listings $\ell_1$, $\ell_2$, $\ell_3$, . . . , $\ell_k$ using sale prices and travel durations. In one embodiment, the method uses any clustering method mentioned in the invention disclosure. Each $\ell_i$ is selected from a cluster, for example as the centroid of the cluster. In one embodiment, at least one additional requirement on clustering is set, including: setting a maximum value for k, such as 20; requiring that $\ell_k$ is as low as possible; setting a minimum range, such as 10 minutes, between a travel duration of an $\ell_i$ and a travel duration of $\ell_{i+1}$; setting a maximum number, such as 5, of listings selected in a neighborhood of travel durations; requiring that only listings with the lowest travel durations are clustered, such as the lowest 2 hours; requiring that only listings with the lowest sale prices are clustered, such the lowest 75 percentiles; requiring that $\ell_1$ is selected from among listings with travel duration in a range, such as in a range of the lowest 5 minutes; selecting an $\ell_i$ that has an approximately lowest sale price, such as within 10% of the lowest sale price of any listing whose travel duration is in a range that includes the travel duration of the $\ell_i$; and so on. In one embodiment, a clustering problem with at least one additional requirement is encoded as a linear program. In one embodiment, a range for a travel duration is different from a range for other travel duration. For example, a range is made more narrow for a travel duration that has listings with relatively lower sale prices. In effect, listings $\ell_1$, $\ell_2$, $\ell_3$, . . . , $\ell_k$are not required to have equally spaced travel durations. Many other ways to compute listings will be apparent to one of ordinary skill in the art, without departing from the scope and spirit of the embodiments.

Earlier, we used a sale price as an embodiment of a quantity. In general, a quantity is an entity that can be compared to other quantity, so that an order can be established. In one embodiment, the quantity is set to a value of a feature, for example to a school rank. In one embodiment, the request describes the quantity, for example the requests says "prefer high sale price", in which case the quantity is a negation of the sale price (that is, sale price multiplied by minus one). In one embodiment, the quantity is derived from a value of a feature using a mathematical formula. For example, a quantity that reflects a "centrality of floor" is computed for a specific listing using a formula $(f/b-0.5)^2$, where b is the number of floors in a building, and f is the floor level of the listing in the building. In one embodiment, an apparatus displays a derived text associated with a derived quantity, such as "centrality of floor", instead of just "floor level". For example, a quantity that reflects a similarity to a geographical bearing is determined as an absolute value of a difference in bearing along a shortest arc (for example, the quantity is 90 degrees for East windows, with respect to a user request that specifies North windows). In one embodiment, the quantity is derived from values of two or more features, for example by dividing the sale price by the area. In one embodiment, the quantity is determined with respect to a feature that is predicted from the desired features. For example, when the user searches for apartments of around 100 square meters, then the quantity is set to |x−100|, where x is the apartment square meter area. In one embodiment, the prediction is automated based on the request and the features, for example using: preset rules; an artificial intelligence software, for example trained on past requests; and so on. In one embodiment, a quantity is equivalent to a score. Many other ways to determine the quantity will be apparent to one of ordinary skill in the art, without departing from the scope and spirit of the embodiments.

In one embodiment, an element (4002) can be characterized as an indication of at least one listing A, and an element (4003) can be characterized as an indication of at least one listing B, both A and B included in an isochrone E, and wherein A is not similar to B. In one embodiment, an element (4009) can be characterized as an indication of at least one listing C, also included in the same isochrone E, wherein A is not similar to C, and also B is not similar to C. In one embodiment, the isochrone E is determined to be wide. For example, given a request for an apartment, the width is at least 160 minutes, when there is no apartment that has a travel duration between 20 minutes and 180 minutes. In one embodiment, an indication of a plurality of sites includes an overview of the plurality of sites.

Many other ways to determine an overview of real estate property listings using a quantity associated with each listing and travel duration will be apparent to one of ordinary skill in the art, without departing from the scope and spirit of the embodiments.

1.3.3 Alternatives

Consider a case of two schools, each of whose school zone includes a given house. In such a case, a child who lives in the house may attend any of the two schools. Once the attendance has been decided, the child commutes to the selected school, but not to the other (not selected) school. Thus, the selected school contributes to the total commute duration of the house. Although the other school does not contribute, it is useful to know that the house enables alternative schools, for example, because the other school may contribute at some other time.

A general problem thus emerges, where we wish to determine an indication of alternative points of interests, in a manner that decreases the information overload placed onto the user, and increases relevance. We present our solution to the problem.

Let us begin with an embodiment concerning alternative schools. Our method operates on a school $S_0$ (5003) and a real estate property H (5002). In one embodiment, the $S_0$ and the H are included in the request. In one embodiment, the H is included in the request, and the $S_0$ is a school nearest H with respect to travel duration or distance. In one embodiment, the $S_0$ is included in the request, and the H is determined by steps of our other method. In one embodiment, both the H and the $S_0$ are determined by steps of our other method. We determine a travel duration $D_0$ (5001) between the school $S_0$ and the real estate property H (for example, a duration of roundtrip travel between H and $S_0$), using any method described in the invention disclosure. We then determine a collection A of alternative schools, whose travel duration is not much bigger relative to the travel duration $D_0$ of the school $S_0$. For this purpose, we determine $m \geq 0$ alternative schools $S_1, \ldots, S_m$ (5004) (5005) (5006) that are nearest the real estate property H. We determine a travel duration $D_i$ between the school $S_i$ and the real estate property H. Then, for each $i \geq 1$, we evaluate if $D_i \leq t$, for a travel duration t (5007), which is set to $D_0$ plus a threshold. Examples of a threshold are: 20 minutes, and 2000 meters. If the evaluation succeeds, then the school $S_i$ (5004) (5005) gets included in the collection A. In one embodiment, if the evaluation fails, then the school $S_i$ (5006) gets excluded from the collection A. The resulting collection A may be empty, for example when every alternative school is very far from the real estate property H. In one embodiment, we include the school $S_0$ in the collection A. In one embodiment, we exclude the school $S_0$ from the collection A. In one embodiment, the collection A includes at least two schools.

Then, we determine an indication of the collection A. The indication includes, but is not limited to, at least one of:

(a) correspondingly, any of the indications characterized in Section 1.3.1;

(b) a semantic of the collection A, such as a text "an average rank of alternative schools";

(c) information obtained by the acquisition module about a school included in the collection A, for example: (i) a name of a school, (ii) a type of a school, (iii) a rank of a school, (iv) a tuition of a school, (v) an admission criterion to a school, or (vi) a probability of admission to a school;

(d) a mathematical statistic (5008) about information obtained by the acquisition module, concerning schools included in the collection A, for example: (i) a number of the schools, (ii) a maximum, a minimum, or an average rank of the schools, (iii) a maximum, a minimum, or an average tuition of the schools, (iv) a probability of admission to any of the schools, to such as $1-\Pi_{i \in A}(1-p_i)$, where $p_i$ is a probability of admission to a school $S_i$, (v) an expected value of a rank, such as $\Sigma_{i \in A}(p_i \cdot r_i)$, where $r_i$ is a rank of a school $S_i$, or (vi) an expected value of a tuition, such as $\Sigma_{i \in A}(p_i \cdot u_i)$, where $u_i$ is a tuition of a school $S_i$;

(e) a mathematical statistic about travel durations $D_i$ for schools included in the collection A, for example: (i) a travel duration $D_i$ or (ii) a maximum, a minimum, or an average travel duration of the schools; or (f) a combination of any of the above, for example: (i) a weighted sum of ranks of the schools, for example weighted by a fraction $D_i/(\Sigma_{j \in A} D_j)$ of a travel duration $D_i$, or (ii) a weighted sum of travel durations of the schools, for example weighted by a probability $p_i$ of admission.

In one embodiment, an indication of the collection A includes a description of travel. In one embodiment, an indication of the collection A includes an indication that is not a description of travel, for example, a number of schools in the collection A. In one embodiment, the notion of "not a description of travel" is further restricted in order to exclude prior art, as will be apparent to one of ordinary skill in the art.

In one embodiment, an indication of the collection A has a non-singular dependence on the collection A. A dependence is called singular, when it is restricted to at most one school of the collection A. Any other dependence is non-singular. For example, the name of a school from a collection A is singular, but the name of a top rank school from a collection A that includes at least two schools is non-singular. A non-singular indication is useful, because it can summarize information about a large collection A. One embodiment of an indication that is non-singular is a mathematical statistic that is a function of a numeric value for each school from a collection A that includes at least two schools, such that the mathematical statistic has a non-zero partial derivative for each of the numeric values. In one embodiment, an average rank of at least two schools is a non-singular indication. In one embodiment, an indication of the collection A includes a singular indication. In one embodiment, an indication of the collection A includes a non-singular indication. In one embodiment, the notion of "non-singular" is further restricted in order to exclude prior art, as will be apparent to one of ordinary skill in the art.

In one embodiment, we explicitly restrict an indication of a collection A, so that the indication does not include any information other than that explicitly recited by a limitation. The limitations include any of the above indications of the collection A, but with an added qualifier "only", for example:

(a) only a name of a school included in the collection A that has the best rank among the schools,
(b) only a number of the schools,
(c) only an average travel duration of the schools,
(d) only an average rank of the schools,
(e) only a combination of two of the indications, or
(f) only a combination of k of the indications, for a $k \geq 3$.

This achieves an advantageous effect, because a limitation decreases the information overload placed onto the user, and increases relevance. For example, presenting the number of schools in the collection A as the only information about the collection A, imposes a small cognitive load onto the user, while offering a useful piece of information to the user.

In one embodiment, the alternative schools $S_1, \ldots, S_m$ are filtered before determining the collection A. In one embodiment, we use a filtering based on the real estate property H being included in a school zone of the relevant school. In one embodiment, the filtering is based on the request. For example, the request may specify: "only private schools", "only schools at most 20 minutes away from the house", "only schools with a tuition at most 500 USD", "only schools with a rank in the best 30th percentile", "only schools where my child may be admitted based on school criteria", "only schools where a chance of admission is at least 80%, given the following characteristics of my child . . . ", and so on. In one embodiment, we use a preset filtering based on a mathematical formula that uses a travel duration $D_i$ or a value of a feature of a school. An example mathematical formula expresses a filtering that has been specified in a request.

In one embodiment, we score schools, in a manner similar to the manner of scoring listings described before. And correspondingly, we use the scores of schools to select a collection A.

In one embodiment, a score of a real estate property listing is determined using information obtained by the acquisition module about a school included in the collection A. For example, a score is increased by a value of a mathematical statistic of the collection A.

In one embodiment, an indication of a plurality of sites includes an indication of a collection A. For example, when a request specifies that real estate properties should be ordered by the school rank, then the indication of a real estate property includes an indication of a nearest school, and an indication of alternative schools of a collection A. In one embodiment, a computation of a collection A is included in any of our methods. In one embodiment, the serving module responds to the request with an indication of a collection A.

The above method concerning an indication of alternative schools can be generalized to an indication of alternative points of interest. However, we need to discuss how to determine alternative points of interest $S_1, \ldots, S_m$. Whether two points of interest can, or cannot, be considered alternatives depends on the specifics of the points of interest, and so can be arbitrary. Hence, our method automatically determines alternatives, in a manner consistent with a view of a person of ordinary skill in the art. For example, if a point of interest is a hospital and the request specifies "orthopedics", then the determination can be based on the hospitals each having an orthopedics ward. In one embodiment, we determine alternative points of interest $S_1, \ldots, S_m$ using a similarity between points of interest.

Many other ways to determine an indication of alternative points of interest will be apparent to one of ordinary skill in the art, without departing from the scope and spirit of the embodiments.

1.3.4 Two-Phase Approach

In one embodiment, the serving module uses a two-phase approach: (phase one) compute estimated travel durations, and use them to select some number of clusters, and (phase two) compute travel durations for the selected clusters, and use the travel durations to determine an indication. In one embodiment, a two-phase approach allows to save resources (phase one), and limit a degradation of quality of travel (phase two). For simplicity of explanation, we will describe an embodiment with reference to just one commute destination (6001). However, it will be clear to one of ordinary skill in the art how to generalize the embodiment to at least one commute destination, without departing from the scope and spirit of the embodiments. The embodiment operates on an arbitrary set of listings, and comprises:

(a) computing an estimated travel duration between each geographical location of the listings and the commute destination, embodiments include:
   (i) identifying a nearby representative (6003) within a threshold of the commute destination (6001), identifying a nearby representative (6005) within a threshold of the geographical location (6007), retrieving a precomputed travel duration (6004) between the two nearby representatives, and setting the estimated travel duration to the retrieved travel duration, optionally augmenting with: a travel duration (6002) between the commute destination (6001) and its nearby representative (6003), or a travel duration (6006) between the geographical location (6007) and its nearby representative (6005),
   (ii) identifying a nearby representative (6003) within a threshold of the commute destination (6001), retrieving a precomputed travel duration (6008) between the nearby representative (6003) and the geographical location (6009), and setting the estimated travel duration to the retrieved travel duration, optionally augmenting with a travel duration (6002) between the commute destination (6001) and its nearby representative (6003),
   (iii) identifying a nearby representative (6011) within a threshold of the geographical location (6013), retrieving a precomputed travel duration (6010) between the commute destination (6001) and the nearby representative (6011), and setting the estimated travel duration to the retrieved travel duration, optionally augmenting with a travel duration (6012) between the geographical location (6013) and its nearby representative (6011), and
   (iv) obtaining from a navigation service a travel duration (6014) between the commute destination (6001) and the geographical location (6015), an example threshold is 1000 meters, or 1 minute of travel, in one embodiment, we identify at least one nearby representative within a threshold of the commute destination or the geographical location, and set the estimated travel duration to a minimum of any travel duration between the commute destination and the geographical location passing via any of the nearby representatives, in one embodiment, we precompute a nearest-neighbor data structure (for example Voronoi cells for representatives with respect to distance or travel duration), and use the nearest-neighbor data structure to determine a nearby representative during request processing;

(b) selecting one or more clusters of listings using the estimated travel durations, but no more than a predetermined bound; the value of the predetermined bound affects the number of clusters for which an indication will later be determined in step (d), and is set based on, but is not limited to, at least one of: a number of clusters for which an indication needs to be included in the response, a degradation of quality of travel introduced by estimated travel durations in step (a), an improvement of quality of travel created by travel durations in step (c), a resource consumption associated with determining estimated travel durations in step (a), or a resource consumption associated with determining travel durations in step (c); for example, the predetermined bound is set to 1000 (for example, selecting highest score clusters, for example, by selecting listings that match the desired features, clustering the selected listings, and scoring the clusters);

(c) determining a travel duration between each geographical location of a listing included in the selected clusters and the commute destination, for example using a prior art method that computes a shortest path, or any method for computing travel mentioned in the invention disclosure; and (d) determining an indication of the selected clusters using the travel durations (for example, after updating clusters and scores using the travel durations; for example, by selecting clusters, such as a number of highest score clusters, the number being at most a preset fraction of the predetermined bound, for example at most 20 highest score clusters).

In one embodiment, the method performs smoothing of travel near a representative. Smoothing prevents travel from having a non-natural shape near a location where precomputed travel joins augmented travel. For example, we retrieve precomputed partial travel of travel that starts at a representative near the source location, and augment the partial travel with travel between the source location and a location that is included in the partial travel (the location does not need to be the representative). Additional information about smoothing can be found in prior art WO 2021222046.

In one embodiment, the method computes an overview using a two-phase approach. In one embodiment, the method computes "first level" listings $\ell'_1, \ell'_2, \ldots, \ell'_{k'}$ as above, but using estimated travel durations instead of travel durations, and using a range that is narrow, for example 1 minute. Because the range is narrow, the value k' will often be large. Then, the method determines travel durations for the listings $\ell'_1, \ell'_2, \ldots, \ell'_{k'}$. Then, the method computes "first level" listings $\ell_1, \ell_2, \ell_3, \ldots, \ell_k$, using a range that is wider, for example 15 minutes, and using the travel durations, by way of reshuffling and pruning the listings $\ell'_1, \ell'_2, \ldots, \ell'_{k'}$. For example, the method computes listings $\ell_1, \ell_2, \ell_3, \ldots, \ell_k$, wherein the computation begins with listings $\ell'_1, \ell'_2, \ldots, \ell'_{k'}$ (above, we presented an embodiment wherein the computation begins with listings L). In one embodiment, the method computes a graphical representation using estimated travel durations. Many other ways to compute an overview using a two-phase approach will be apparent to one of ordinary skill in the art, without departing from the scope and spirit of the embodiments.

In one embodiment, the method uses a two-phase approach in our methods. In one embodiment, the method computes an indication of at least two alternatives using a two-phase approach, wherein the collection A is determined using estimated travel durations, and an indication is determined using travel durations. In one embodiment, the method computes an isochrone using estimated travel durations, and then an indication using travel durations. Many other ways to use a two-phase approach in our methods will be apparent to one of ordinary skill in the art, without departing from the scope and spirit of the embodiments.

1.3.5 Modified Steps

In one embodiment, the serving module performs modified steps compared to the steps described in the invention disclosure. For example, the serving module performs the steps: in other order, partially concurrently, or by combining or omitting some steps. In one embodiment, the two steps of grouping and clustering are combined into one step. For example, we expand feature vectors. We take a feature vector of a listing, and add: a feature and a value that denotes a travel duration between a geographical location of the listing, and the at least one commute destination, and also add features and values of relevant points of interest. Feature vectors expanded this way get clustered. In one embodiment, clusters are determined using any clustering method mentioned in the invention disclosure. In one embodiment, clusters satisfy additional requirements. For example, we restrict any cluster to span at most a range of minutes along the axis of the added feature, for example at most 15 minutes. In one embodiment, precomputed clusters are used to accelerate clustering during request processing, for example, by way of a clustering algorithm starting its execution at precomputed clusters. In one embodiment, the step of selecting clusters does not use similarity. In one embodiment, the step identifies a cluster of at least one site. In one embodiment, the step identifies at least one site using any information included in a request described in the invention disclosure, for example: a filtering restriction, or the desired features. Many other ways to perform modified steps will be apparent to one of ordinary skill in the art, without departing from the scope and spirit of the embodiments.

2 General Case

We use the term travel in a broad sense, consistent with an interpretation of the term by a person of ordinary skill in the art. The term has a meaning that includes moving objects or data. A description of travel is anything that a person of ordinary skill in the art would name so. Here are some examples of a description of travel: (1) "hey buddy, you need to go one block north, and then turn slightly left", and (2) "5 dollars". A length of travel is a numeric value that a person of ordinary skill in the art can associate with travel, for example: a monetary cost of travel; a metric distance; a fuel consumption; a specific feature or attribute of a description of travel, for example: a number of transfers, or a walking distance. As other example, we may use a term travel duration when we mean a length of travel that represents time. In one embodiment, a length of travel is derived using any of the endpoints of travel, including: a real estate property, a commute destination, or any of their feature or value. For example, a length of travel is derived using a weighted sum of values, for example, a sum of two values: (1) a metric distance from an exit door of a corporation to an entrance door of a building, and (2) a value of the feature that represents the floor level of a real estate property in the building. In one embodiment, a length of travel uses the request. For example, the request includes an arbitrary conversion between two values. For example, a length of travel is a fuel consumption multiplied by a conversion rate from a unit of fuel into an amount of money, thereby converting an optimization objective that uses fuel consumption into an optimization objective that uses monetary cost. In one embodiment, a length of travel uses an arbitrary preset conversion. In one embodiment, a length of travel uses two or more optimization objectives that are combined into one optimization objective, for example using an arbitrary mathematical formula, such as a weighted sum. In one embodiment, optimization objectives are combined into a multi-objective optimization search based on a multi-dimensional cost. For example, a method searches for a real estate property that minimizes a travel duration that is penalized by a monetary cost of travel, and is permitted by a filtering restriction. A length of travel is by itself a description of travel. A description of travel: may not include any length of travel, may include only a length of travel, or may also include some other data. The invention disclosure teaches how to compute a description of travel, for example using any method for computing travel described in the invention disclosure, or any prior art for computing travel mentioned in the invention disclosure, for example using the Dijkstra's algorithm.

We use the term transportation system in a broad sense, consistent with an interpretation of the term by a person of ordinary skill in the art. Some embodiments include: a system of roads and cars; a public transportation system comprising buses and subways; a system of walk pathways; airports, airplanes and air corridors; or ships and sea lanes. A transportation system needs not physically move objects. A method of the invention disclosure merely needs to be able to determine a description of travel between the elements of the transportation system. Thus, a transportation system that moves data, is an example of a transportation system. For example, a computer network comprising these transportation elements: wires/lines (analogous to roads), and hubs/switches (analogous to stops/turns). Any combination of transportation systems allowing for a transfer between them is a transportation system. Many other examples of a transportation system will be apparent to one of ordinary skill in the art, without departing from the scope and spirit of the embodiments.

In one embodiment, our invention concerns other than real estate embodiments of searching or comparing. In one embodiment, our method presents job postings, using similarity among job postings and travel durations between the locations where the jobs are performed and a home location. See prior art WO 2021222046 for embodiments of searching or comparing.

In general, a method of the invention disclosure uses arbitrary sites (a site was called a real estate property in earlier sections) and arbitrary places (a place was called a commute destination in earlier sections) both included in a transportation system, and the method determines an indication of at least one site, using at least one description of travel (a travel duration used in earlier sections is generalized to a description of travel) between the at least one site and at least one place. A site is an arbitrary location. It can be any real estate property, for example an apartment, a rented room, a house with a garden, a ranch, a hotel, etc. It can also be a site where a person works, a restaurant, a shop, etc. A place is also an arbitrary location. It includes a school, a grandparent's home, a weekend golf course, a favorite restaurant, a doctor's office, a place of worship, etc. It can also be a place where a person lives. In one embodiment, a point of interest is interpreted as a site. In one embodiment, a point of interest is interpreted as a place.

One embodiment is a method for searching or comparing at least one site using at least one description of travel within a transportation system between the at least one site and at least one place, the method comprising: (a) receiving a request comprising the at least one place; and (b) responding to the request with a result of searching or comparing obtained using the at least one description of travel. In one embodiment, a result of searching or comparing is an embodiment of an indication of at least one site.

In one embodiment, a method of the invention disclosure performs variants of the functionality or steps described earlier. In one embodiment, some functionality or steps are performed in other order, partially concurrently, or some functionality or steps are combined or omitted. For example, a method performs serving, but not acquisition nor indexing. In other example, the indexing module (1003) does not produce any inverted index (1005), or does not produce any clustering (1006). In other example, a request does not contain a specification of at least one commute destination. In one embodiment, a method performs clustering or scoring without using a travel duration between a real estate property and at least one commute destination. In one embodiment, a plurality of listings is determined using one of the following, but not both: (i) similarity among listings, or (ii) travel duration between a geographical location of a listing and at least one commute destination. Many other ways to perform variants of the functionality or steps will be apparent to one of ordinary skill in the art, without departing from the scope and spirit of the embodiments.

Aspects of the invention may take a form of a hardware embodiment, a software embodiment, or a combination of the two. Steps of the invention, for example blocks of any flowchart, may be executed out of order, partially concurrently or served from a cache, depending on functionality or optimization. Aspects may take form of a sequential system, or parallel/distributed system, where each component embodies some aspect, possibly redundantly with other components, and components may communicate, for example using a network of any kind. The invention is not described with reference to any specific programming language. A computer program containing instructions that carry out steps for aspects of the invention may be written in any programming language, for example C++, Java, or JavaScript. Any program may execute on an arbitrary hardware platform, for example a Central Processing Unit (CPU) or a Graphics Processing Unit (GPU), and associated memory or storage devices. A program may execute aspects of the invention inside one or more devices, including, but not limited to: a smartphone running Android or iOS operating systems, or a web browser, for example Firefox, Chrome, Internet Explorer, or Safari.

3 Method

Embodiments of the invention include the following methods.

1. A method for determining an indication of a plurality of sites included in a transportation system using a length of travel and a similarity, the method characterized by:

(a) receiving a request comprising at least one place included in the transportation system;

(b) determining at least two isochrone sites included in the plurality of sites, wherein a length of travel within the transportation system between each isochrone site and the at least one place is included in a range;

(c) determining the indication using steps comprising one of:

i. determining a plurality of similar sites included in the at least two isochrone sites, and determining the indication of the plurality of similar sites, or ii. selecting at least one first site that is not similar to at least one second site, both included in the at least two isochrone sites, and determining the indication of the at least one first site and the at least one second site; and (d) responding to the request with the indication.

2. A method for determining an overview of a plurality of sites included in a transportation system using a length of travel and a quantity, the method characterized by:

(a) receiving a request comprising at least one place included in the transportation system;

(b) computing a sequence of two or more sites included in the plurality of sites, wherein i. for a first site and a second site included in the sequence, a length of travel within the transportation system between the first site and the at least one place is at least a range apart from a length of travel within the transportation system between the second site and the at least one place, and ii. a quantity associated with a third site included in the sequence is at most a quantity associated with a fourth site included in the plurality of sites, whenever a length of travel within the transportation system between the fourth site and the at least one place is in a neighborhood of a length of travel within the transportation system between the third site and the at least one place;

(c) determining the overview that includes an indication of the sequence; and (d) responding to the request with the overview.

3. A method for determining an indication of at least two alternatives included in a plurality of points of interest included in a transportation system, the method characterized by:

(a) receiving a request comprising a site included in the transportation system;

(b) determining the at least two alternatives, wherein a length of travel within the transportation system between each alternative and the site is within a threshold of shortest;

(c) determining an indication of the at least two alternatives that is non-singular and is not a description of travel; and (d) responding to the request with the indication.

4. A method for determining an indication of at least two sites included in a transportation system using an estimated length of travel and a length of travel, the method characterized by:

(a) receiving a request comprising at least one place included in the transportation system;

(b) determining at least two estimated lengths of travel, including an estimated length of travel within the transportation system between each site included in the at least two sites and the at least one place;

(c) selecting one or more sites included in the at least two sites using the at least two estimated lengths of travel, wherein a number of the one or more sites is at most a predetermined bound;

(d) determining at least one length of travel, including a length of travel within the transportation system between each site included in the one or more sites and the at least one place;

(e) determining the indication of the one or more sites using the at least one length of travel; and (f) responding to the request with the indication.

4 Computer System and Apparatus

One of the embodiments of the invention is a computer system (an illustration is in FIG. 1). The computer system has a hardware embodiment, a software embodiment, or a combination of the two. The computer system includes at least one processor, for example a CPU or a GPU. The computer system includes a non-transitory computer-readable storage medium storing one or more programs for execution by the at least one processor. Embodiments of a non-transitory computer-readable storage medium are well-known in the art, and so need not be described herein. The one or more programs comprise instructions to be executed by the at least one processor, so as to perform at least one step of a method described in the invention disclosure. In one embodiment, the instructions are expressed in any programming language, for example C++, Java or JavaScript. Each method yields a computer system. Any such computer system can be viewed as a general-purpose computer that is specifically programmed to carry out a specific method described in this invention disclosure. Therefore, in effect, the computer system is a special purpose computer, programmed to perform specific steps of the method, in accordance with the instructions of the software (the one or more programs) that encode the method. Many other embodiments of a computer system will be apparent to one of ordinary skill in the art, without departing from the scope and spirit of the embodiments.

Figure 3:
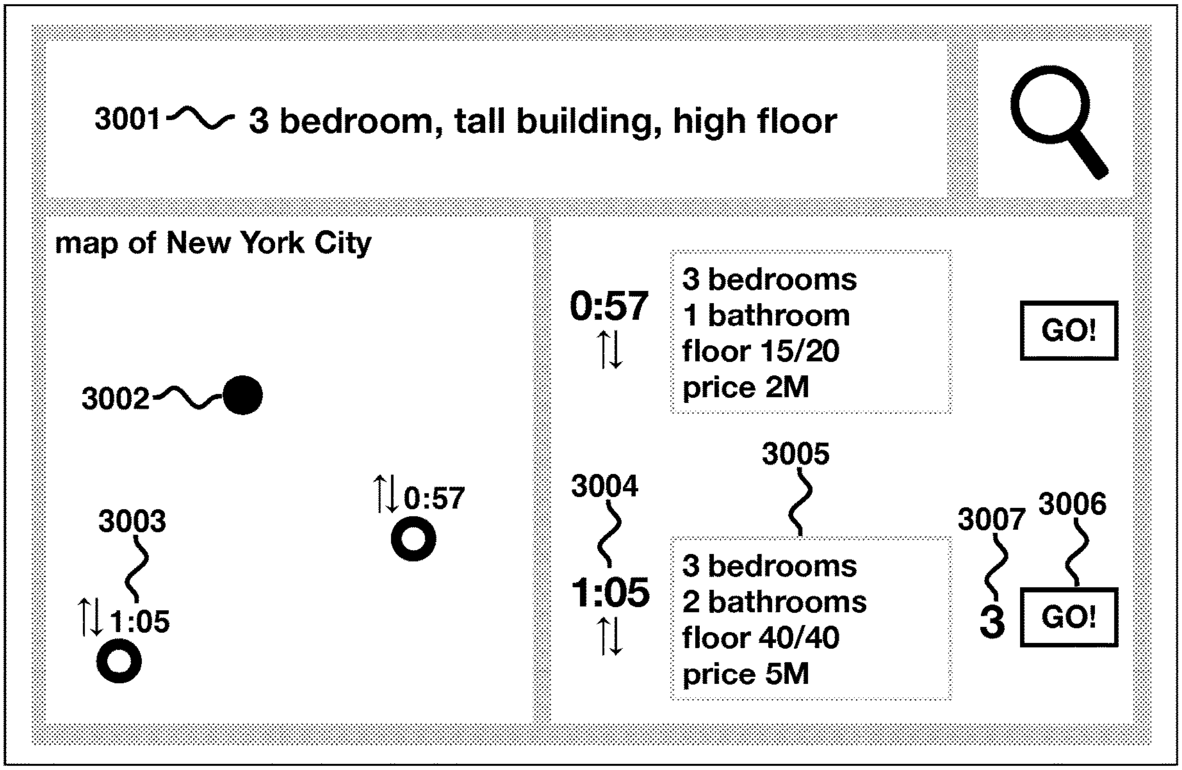
FIG. 3: depicts an example User Interface that receives a request from a user and presents a response to the user.

One of the embodiments of the invention is an apparatus, also called a device. Illustrations are presented in FIG. 3, FIG. 4 and FIG. 5. It will be obvious to anyone of ordinary skill in the art that the presentation of an apparatus in our drawings can be modified (for example, by rearranging, resizing, changing colors, shape, adding or removing components), without departing from the scope and spirit of the embodiments. The apparatus has a physical embodiment, for example as a smartphone application or a webpage. The apparatus receives a request from a user via a "receiver", for example a User Interface of the smartphone application, for example where the user can type the address of a workplace into a search box, tap a map displayed by the smartphone application in order to specify a location of a workplace, talk to a speech recognition engine to describe a location of a workplace, provide a GPS reading that encodes a location of a workplace, and so on. In one embodiment, the receiver receives any information included in a request described in the invention disclosure. The apparatus then generates an indication using a method described in the invention disclosure. In one embodiment, the generation is performed by executing appropriate one or more programs on appropriate at least one processor. The apparatus then responds to the user by presenting the indication via a "transmitter", for example: a display in the smartphone application (for example, by displaying (3005), as depicted in FIG. 3), a speech synthesizer (for example, by talking to the user), an augmented reality lens included in glasses mounted on the head of the user, a 3D projector of the Jedi Knights, and so on. It will be obvious to anyone of ordinary skill in the art that the invention is not limited to one kind of apparatus, neither to one kind of receiver, nor to one kind of transmitter. Many other embodiments of an apparatus will be apparent to one of ordinary skill in the art, without departing from the scope and spirit of the embodiments.

5 Closing Paragraphs

Those of ordinary skill in the art shall notice that various modifications may be made, and substitutions may be made with essentially equivalents, without departing from the scope and spirit of the embodiments. Besides, a specific situation may be adapted to the teachings of the invention, without departing from the scope and spirit of the embodiments. Therefore, despite the fact that the invention has been described with reference to the disclosed embodiments, the invention shall not be restricted to these embodiments. Rather, the invention will include all embodiments that fall within the scope of the appended claims.

Each claimed method includes no “mental process” (no step of any claimed method is performed in the human mind). Each claimed method is automated. Section 4 describes examples of automation. The scope of each claimed method excludes any embodiment that is ineligible for a patent in the specific jurisdiction where this patent application is filed during the PCT National/Regional Phase. For example, a patent application in Canada implicitly recites that each claimed method is limited to embodiments eligible for a patent in Canada. Each specific jurisdiction excludes embodiments specific to the jurisdiction (different jurisdictions may exclude different sets of embodiments).

In one embodiment, any claimed method is implemented on a computer system (is computer-implemented) and is for achieving a purpose on a device (such as, a purpose of searching or comparing, or determining an indication). Section 4 describes examples. In one embodiment, any claimed method is limited to embodiments that fall within the scope of the “manner of manufacture” within the meaning of the Statute of Monopolies used in New Zealand, as will be apparent to one of ordinary skill in the art. In one embodiment, any claimed method is limited to embodiments that fall within the scope of the “technical character” within the meaning of the European Patent Convention, as will be apparent to one of ordinary skill in the art.

Any prior art cited in the invention disclosure is considered to be ordinary knowledge in the art; any person of ordinary skill in the art has that knowledge.

Antecedent basis is sometimes tracked with boxes in the claims: a term in a claim can later be used as the term.

We include a glossary of selected phrases that occur in the claims, and example references to the specification. These references are not intended to be exhaustive; other references exist. The sequence of the phrases in the table is intended to follow the order in which the terms appear in the claims.

| phrase | example reference |
|---|---|
| indication | paragraph [038] |
| site | paragraph [072] |
| plurality of sites (plurality of listings, cluster of listings, clusters, group) | paragraph [034], [035], [068], [074] |
| transportation system | paragraph [070] |
| description of travel | paragraph [069] |
| similarity | paragraph [004] |
| request | paragraph [031], [035], [036], [037], [078] |
| place | paragraph [072] |
| at least one place (at least one commute destination) | paragraph [031] |
| isochrone site (listing in a group, listing in a cluster) | paragraph [034], [068] |
| length of travel | paragraph [069] |
| range | paragraph [034], [068], [042] |
| similar sites (similar listings, cluster) | paragraph [035], [068] |
| selecting | paragraph [037], [040], [064], [068] |
| not similar | paragraph [040], [049] |
| first site, second site (first listing, second listing) | paragraph [040], [049] |
| overview | paragraph [041] |
| quantity | paragraph [041] |
| sequence | paragraph [042] |
| neighborhood | paragraph [042] |
| at least two alternatives | paragraph [053] |
| points of interest | paragraph [020], [062] |
| threshold | paragraph [053] |
| not a description of travel | paragraph [055] |
| non-singular | paragraph [056] |
| estimated length of travel (estimated travel duration) | paragraph [033], [064] |
| predetermined bound | paragraph [064] |

The invention claimed is:

1. A method for determining an indication of a plurality of sites included in a transportation system using a length of travel and a similarity, the method characterized by:

(a) receiving a request comprising at least one place included in the transportation system;

(b) determining at least two isochrone sites included in the plurality of sites, wherein a length of travel within the transportation system between each isochrone site and the at least one place is included in a range;

(c) determining the indication using steps comprising one of:

i. determining a plurality of similar sites included in the at least two isochrone sites, and determining the indication of the plurality of similar sites, or ii. selecting at least one first site that is not similar to at least one second site, both included in the at least two isochrone sites, and determining the indication of the at least one first site and the at least one second site; and (d) responding to the request with the indication.

* * * * *